United States Patent
Gehlot

(10) Patent No.: US 6,263,465 B1
(45) Date of Patent: Jul. 17, 2001

(54) ERROR DETECTION AND CORRECTION IN SYSTEMS RECEIVING NRZ SIGNALS FROM TRANSMISSION OF RZ SIGNALS

(75) Inventor: Narayan L. Gehlot, Sayerville, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/196,984

(22) Filed: Nov. 20, 1998

(51) Int. Cl.[7] .............................. G06F 11/00; H03M 7/12; G08C 25/00
(52) U.S. Cl. .............................. 714/746; 341/69
(58) Field of Search .................... 714/746, 748, 714/778, 810; 341/52, 68, 69, 94

(56) References Cited

U.S. PATENT DOCUMENTS

| | | |
|---|---|---|
| 4,905,257 * | 2/1990 | Palkert et al. .................. 375/87 |
| 5,151,698 * | 9/1992 | Pophillat ........................ 341/52 |
| 5,940,018 * | 8/1999 | Kim et al. ...................... 341/94 |
| 6,031,472 * | 2/2000 | Johnson et al. ................ 341/58 |

OTHER PUBLICATIONS

Gorshe, Generalized and Efficient Techniques for Design of CMI and other Encoders, IEEE, p. 687–690, Mar. 1997.*
Pophillat, Novel Linecoding scheme for Optical Transmissions, IEEE, p. 2129–2130, Dec. 1990.*

* cited by examiner

Primary Examiner—Albert De Cady
Assistant Examiner—Shelly A Chase
(74) Attorney, Agent, or Firm—Wolff & Samson

(57) ABSTRACT

The present invention is a simple method of error detection and correction that is easy to implement in data transmission. The invention presents a self-correcting error coding method that advantageously eliminates bandwidth and power penalty. In addition, feedback error control and data retransmission are not required for implementing the method of the invention. System and transmission channel resources are conserved as a result.

20 Claims, 6 Drawing Sheets

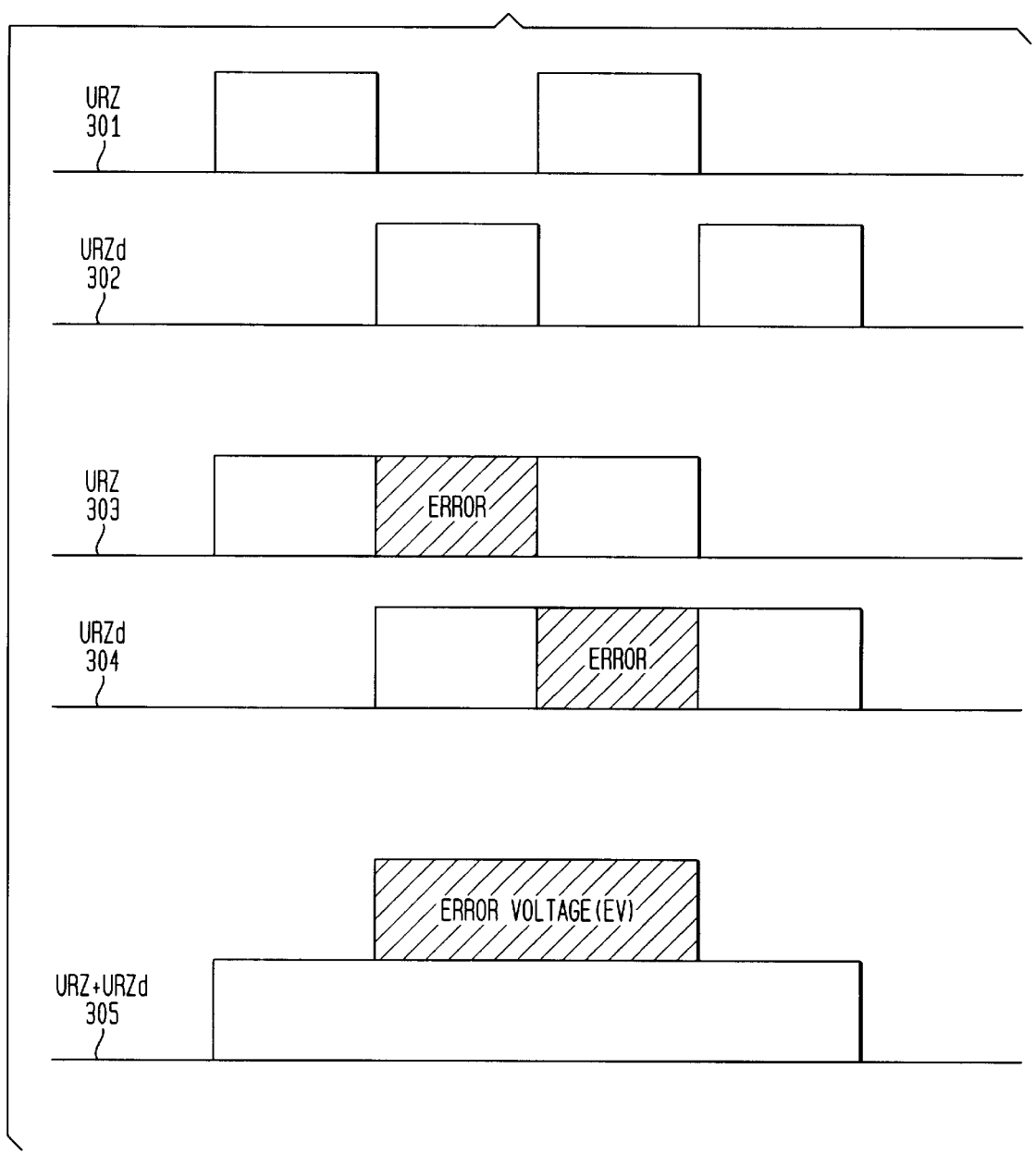

ERROR DETECTION AND CORRECTION IN SYSTEMS RECEIVING NRZ SIGNALS FROM TRANSMISSION OF RZ SIGNALS

CROSS REFERENCE TO RELATED APPLICATIONS

This application is related to U.S. patent application Ser. No. 09/197,223, entitled "SYSTEM AND METHOD FOR GENERATING NRZ SIGNALS FROM RZ SIGNALS IN COMMUNICATIONS NETWORKS" (GEHLOT-7); U.S. patent application Ser. No. 09/197,071, entitled "AUTOMATIC DELAY COMPENSATION IN SYSTEMS RECEIVING NRZ SIGNALS FROM TRANSMISSION OF RZ SIGNALS" (GEHLOT-9); U.S. patent application Ser. No. 09/197,154, entitled "SYSTEM AND METHOD FOR IMPROVED SIGNAL TO NOISE RATIO IN OPTICAL COMMUNICATIONS NETWORKS" (GEHLOT-10); U.S. patent application Ser. No. 09/197,390, entitled "SYSTEM AND METHOD FOR REDUCTION OF IMPACT FROM UNWANTED SIGNALS IN OPTICAL COMMUNICATIONS SYSTEMS" (GEHLOT-8); U.S. patent application Ser. No. 09/197,222, entitled "APPARATUS AND METHOD TO OVERCOME DISPERSION LIMITATIONS IN HIGH SPEED COMMUNICATIONS SYSTEMS AND NETWORKS" (GEHLOT-5); U.S. patent application Ser. No. 09/197,073, entitled "APPARATUS AND METHOD FOR REDUCING OPTICAL IMPAIRMENTS IN OPTICAL COMMUNICATIONS SYSTEMS AND NETWORKS" (GEHLOT-6); and U.S. patent application Ser. No. 09/197,403, entitled "APPARATUS AND METHOD FOR REDUCING PHASE MODULATED GAIN FLUCTUATIONS IN OPTICAL COMMUNICATIONS SYSTEMS AND NETWORKS" (GEHLOT-12); the related applications being concurrently filed with the present application, all of the related applications having the same inventor, and all of the aforementioned related applications being incorporated herein by reference.

FIELD OF INVENTION

The present invention is in the field of error coding and performance monitoring in data transmission. In particular, the invention relates to an inter-coding error detection and correction method for transmitting coded data in electrical or optical communication systems.

BACKGROUND OF INVENTION

There are many error detection and correction techniques known in the art, such as forward error correction (FEC), feedback error correction, block and convolutional coding, and automatic request and repeat (ARQ) methods.

A basic procedure for error detection and correction is to design a code in which each word contains more bits than needed to represent all the symbols used in a data set. Both the transmitter and the receiver use the same coding to detect and correct errors. If a bit sequence is found that is not among those assigned to the data symbols, an error is known to have occurred. One such commonly used error-detection code is called the parity check. In general, the efficiency of error monitoring and correction performance is directly proportional to the amount of parity check information put into the data stream.

FEC introduces redundancy into data to check for errors without retransmission. In FEC, data transmission efficiency is sacrificed by adding extra bits to the data stream, to detect and correct errors caused by noise in the transmission channel. Nonetheless, it is possible to detect and correct all errors if a sufficient number of control bits are added to the data stream. Usually some compromise is made between data transmission efficiency and the ability to check and correct errors. Depending on the coding, error correction data constitute 10 to 40 percent of the information being transmitted in the channel.

Block and convolutional codes introduce redundancy by adding parity symbols to the message data. The codes map k source symbols to n code symbols and have a code rate of $R=k/n$. With fixed information rates, this redundancy results in increased bandwidth and lower energy per transmitted symbol. At low signal-to-noise ratios (SNR), these codes cannot rectify the large number of errors because of bandwidth limitations, and performance is degraded as a result. Coding techniques, as a result, become ever more complex and demand more redundant information to be put into the data stream to ensure reliable error correction.

Feedback error control detects but does not attempt to correct errors at the receiver end of the data transmission. When an error is detected in a block of data, the transmitter is notified by the use of a narrowband reverse channel. The block of data in error is then retransmitted to the receiver. This control mechanism also causes reduction in data rate, since time is consumed in retransmission of data. Even though this error correction technique is 100 percent efficient when there are no errors present in the data stream, it requires complicated feedback control mechanisms for correcting errors in the original transmission and subsequent data retransmission.

Error correction techniques such as ARQ require feedback designs for data retransmission. With higher error rates, the delay due to retransmission and the increase in the number of retransmissions would render the ARQ mechanism very complex to implement. High rates of retransmission also consume more transmission power and bandwidth on the transmission channel. Given the characteristics of ARQ, the implementation complexities described above will be further magnified, particularly with respect to detecting and correcting errors in data retransmission.

As can thus be seen, conventional error detection and correction methods typically require either retransmission of data (e.g., ARQ) or the transmission of additional error-checking information (such as parity check bits) that puts additional demand on bandwidth and transmission power. Those existing methods require added memory, greater bandwidth and more complex hardware to implement error correction and detection, with the further constraint that the transmitter and the receiver use the same coding format.

Therefore, there is a need for a simple method for detecting and correcting errors that is easy to implement without additional bandwidth penalty and error-checking information. A method is needed for correcting errors without feedback error control so that the negative effects of data retransmission are eliminated, without sacrificing error checking capability.

SUMMARY OF THE INVENTION

The invention presents a simple error detection and correction method that is easy to implement without data retransmission and bandwidth penalty. The invention can be used in data code generation for transmitting information over communication systems such as wireless, optical, modem, cable television and data networks.

The invention is a self-correcting error coding method that has the capability of checking errors in the data stream across coding formats. In particular, the method of the invention provides an inter-coding error detection method in the circumstance of the source data being transmitted in URZ (unipolar return to zero) coding format and being received in UNRZ (unipolar non-return to zero) coding format. System and transmission channel resources are conserved since additional error coding data are not required in the implementation of the method of the invention. In addition, the complexity of hardware resources, such as feedback error control between the transmitter and the receiver, is eliminated.

BRIEF DESCRIPTION OF THE DRAWINGS

FIGS. 3A and 3B illustrate the method of the invention as applied in the capacitance detector used in the error-correct function.

DETAILED DESCRIPTION

Figure 1A:
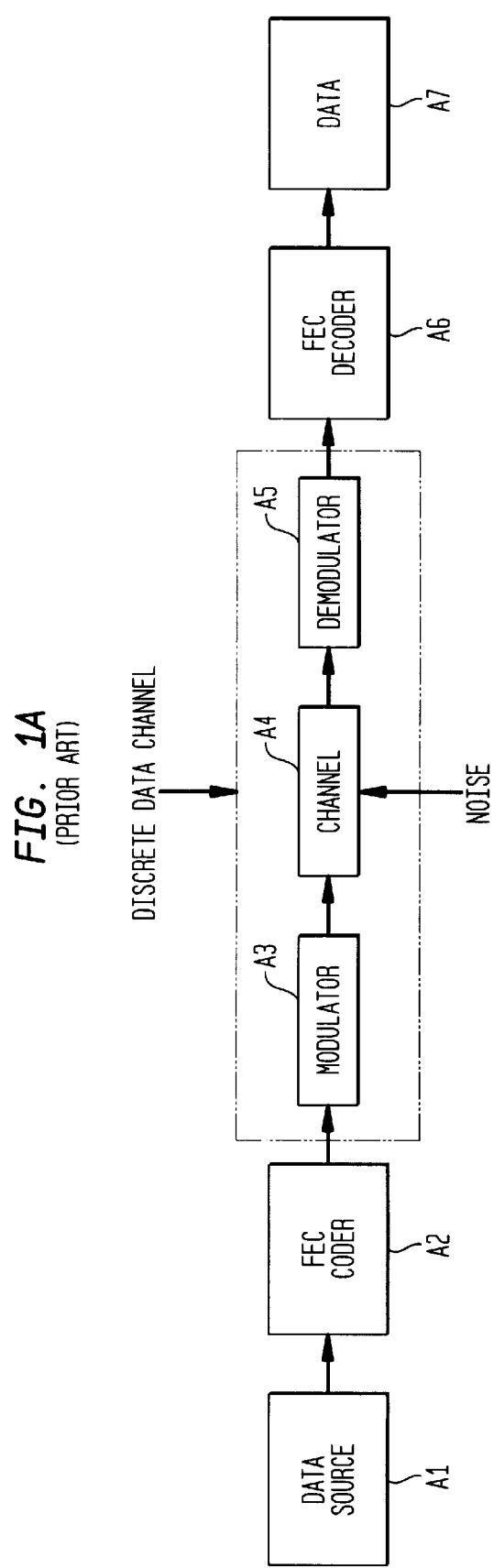
FIG. 1A is a block diagram that illustrates a conventional FEC method.

FIG. 1A illustrates a conventional communication system that incorporates FEC in its implementation. The FEC methodology is well known in the art. Referring to FIG. 1A, the encoder (FEC Coder A2) acts on the source data that are to be transmitted through a data channel. The FEC Coder (A2) maps the source data to binary (or, q-ary, depending on the coding format) coded data which are modulated and transmitted (this modulation and transmission function shown collectively as Modulator A3). After transmission in the Data Channel (A4), the data are demodulated in Demodulator A5. An exemplary modulation and demodulation method is BPSK, or binary phase shift keying. During transmission, the signal can be corrupted by noise or errors that will appear in the demodulated symbol sequence. FEC Decoder A6 then attempts to correct errors based on the error correction protocol and the transmitted error correction bits, and to thereby restore the original source data for output at A7.

Preferred embodiments of the invention are hereafter described. It is noted that, while the method of the invention is illustrated based on URZ and UNRZ coding, it will readily be seen by those ordinarily skilled in the art that such method can be implemented for other coding or modulation techniques applied in electrical and optical communication systems.

The method of the invention is an inter-coding error detection technique in which data is transmitted in URZ format and received in UNRZ format, while conserving hardware and software resources without memory and bandwidth penalty. In order to achieve such an improvement in power penalty, the present invention takes advantage of a unique hybrid coding scheme that enables two occurrences of identical URZ data to be transmitted (one occurrence being delayed by a given amount) where the two transmissions are later combined to produce UNRZ data. As is explained more fully in co-pending U.S. patent application Ser. No. 09/197,223 entitled "SYSTEM AND METHOD FOR GENERATING NRZ SIGNALS FROM RZ SIGNALS IN COMMUNICATION NETWORKS" (GEHLOT-7), which is incorporated herein by reference, this hybrid coding method has significant advantages over prior art in that it is an efficient way to receive UNRZ data by transmitting URZ coded data. This is significant, particularly for optical systems, in that URZ coded data has properties that favor optical transmission and it is therefore desirable to be able to transmit URZ data instead of UNRZ data and still be able to realize the benefits of receiving UNRZ data.

Figure 1B:
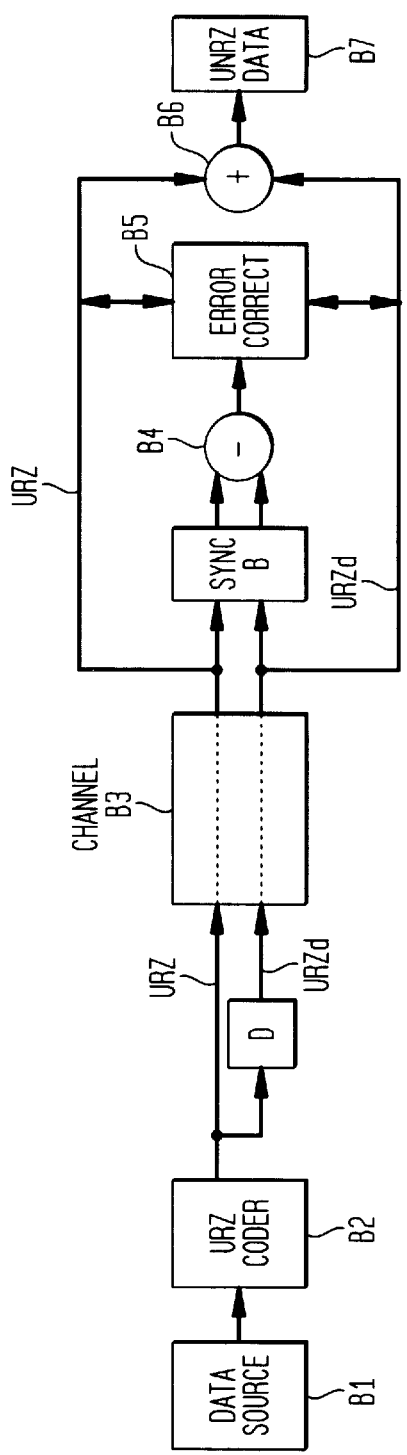
FIG. 1B shows an embodiment of the invention.

FIG. 1B is a block diagram that illustrates an embodiment of the invention with a two-path transmission channel. Referring to the figure, the Data Source B1 sends data to URZ Coder (B2), that operates to transform the data into URZ-coded data. The output of URZ Coder (B2) is split to provide two copies of the URZ encoded data signal. One of the two output URZ-coded signals from URZ Coder (B2) is sent to the data channel (B3) for transmission to the receiver. The second URZ-coded signal is delayed (by delay element D) by a given time period to obtain a $URZ_d$ signal. According to the method of the invention, the optimal delay is set at one half of the bit interval in the data stream. A second channel for transmitting the $URZ_d$ signal is also provided in the transmission path to the receiver. In the illustrative embodiment shown, channel B3 has two transmission paths. Channel B3 can also be a multi-path data transmission channel. Similarly to the case of FEC error correction, the transmitted URZ and $URZ_d$ data may be corrupted by noise during transmission in the data channel.

After transmission, the two encoded data signals (URZ and $URZ_d$) are synchronized by Sync B, removing the delay for $URZ_d$. Note, however, that the originally received URZ and $URZ_d$ signals are also maintained. The synchronized $URZ_d$ signal is subtracted from the URZ signal by Subtractor B4. If there are no errors, the result of the subtraction of the synchronized signals is 0 for all bits in the data set. However, a subtraction result of either +1 or −1 indicates error in the bit under consideration. A subtraction result of +1 means that the particular bit of URZ is in error. A subtraction result of −1 means that the particular bit of $URZ_d$ is in error. The Error-Correct means B5 then corrects all errors in each of the originally received URZ signals, which are independently provided as inputs to Error Correct means B5. The corrected URZ and $URZ_d$ signals are then provided as inputs to Adder B6 for a summation operation. After summation of the URZ and $URZ_d$ signals by Adder B6, according to the method of the companion cross-referenced application entitled "SYSTEM AND METHOD FOR GENERATING NRZ SIGNALS FROM RZ SIGNALS IN COMMUNICATIONS NETWORKS" (GEHLOT-7), the transmitted data are then represented by a UNRZ-coded signal for that data at B7.

It can thus be seen that the method of the invention provides an inter-coding error detection method in the circumstance of the source data being transmitted in URZ coding format and being received in UNRZ coding format. System resources are advantageously conserved because additional parity check coding is not required to implement the method of the invention. In addition, hardware resources, such as feedback error control between the transmitter and the receiver, are no longer needed.

Figure 1C:
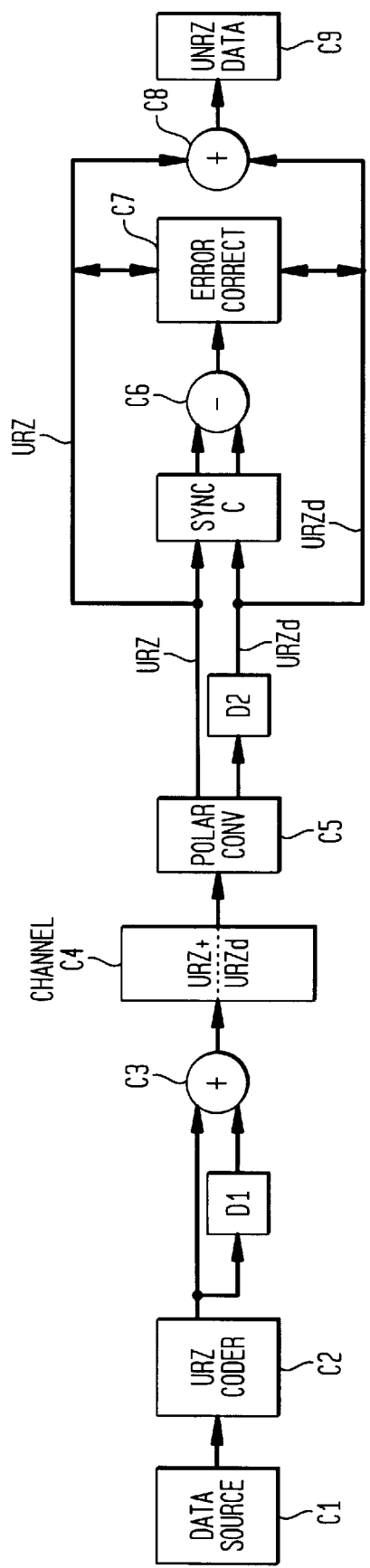
FIG. 1C shows another embodiment of the invention.

FIG. 1C illustrates another embodiment of the invention with a single-path transmission channel. Referring to the figure, Data Source C1 transmits data to URZ Coder C2, that operates to transform the data into URZ-coded data. After splitting the output from URZ Coder C2 to form two signals, the second signal is delayed at D1 by a given time period. The two delayed signals have different states of polarization.

According to the method of the invention, the optimal delay is set at one half of the bit interval in the data stream. The signal and its delayed counterpart are added by Adder C3 and superimposed upon each other to form a composite signal (LRZ+URZ$_d$) for transmission to the receiver using the same channel. Even though the two signals are combined into one composite signal, they retain their different states of polarization. In this illustrated embodiment, channel C4 has a single transmission path. Similarly to the case of FEC error correction, the composite signal may be corrupted by noise during transmission in the data channel C4.

After transmission, the composite signal is split to provide two copies of the URZ encoded composite signal, the second one of which is delayed by D2 to create the URZ$_d$ signal. The split is performed by a polarization converter (Polar Conv C5) that distinguishes the different states of polarization of the two signals. Note that the delay values of D1 and D2 are calibrated such that the optimal delay between the two signals (URZ and URZ$_d$) are one-half the bit interval of the transmitted data in the system.

The two signals (URZ and URZ$_d$) are then synchronized by Sync C, removing the delay for URZ$_d$. Note, however, that the originally received URZ and URZ$_d$ signals are also maintained. The synchronized URZ$_d$ signal is subtracted from the URZ signal by Subtractor C6. If there are no errors, the result of the subtraction of the synchronized signals is 0 for all bits in the data set. However, a subtraction result of either +1 or −1 indicates error in the bit under consideration. A subtraction result of +1 means that the particular bit of URZ is in error. A subtraction result of −1 means that the particular bit of URZ$_d$ is in error. Error Correct means C7 then corrects all errors in each of the originally received URZ signals, which are independently provided as inputs to Error Correct means C7. The corrected URZ and URZ$_d$ signals are then provided as inputs to Adder C8 for a summation operation. After summation of the URZ and URZ$_d$ signals by Adder C8, according to the method of the companion cross-referenced application entitled "SYSTEM AND METHOD FOR GENERATING NRZ SIGNALS FROM RZ SIGNALS IN COMMUNICATIONS NETWORKS" (GEHLOT-7), the transmitted data are then represented by a UNRZ-coded signal for that data at C9.

For implementing the current embodiment in an optical or, in particular, a WDM communications system, one skilled in the art can readily see that the illustrative embodiment of the invention in FIG. 1C is advantageously transmitting data on a single path, or on a single wavelength in WDM. According to the method of the invention, error correction is advantageously performed by using URZ and URZ$_d$ codings of the original data to modulate the optical carrier without requiring an extra channel for transmitting additional wavelength information. System resources are optimally conserved since additional compensation fiber and variable compensation mechanisms for unnecessary channel requirements are eliminated.

Figure 2:
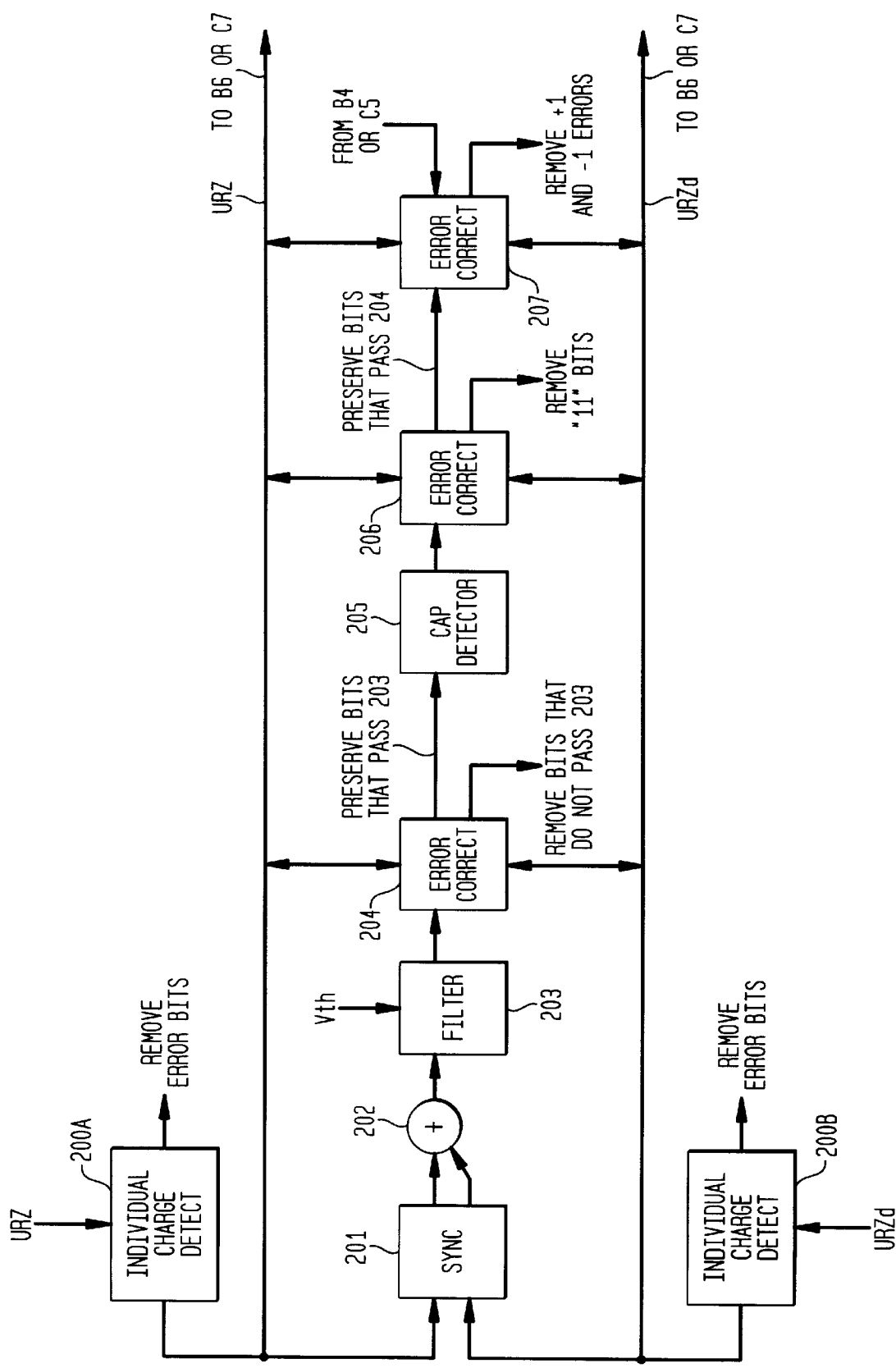
FIG. 2 shows a specific embodiment of the error-correct function in the invention.

FIG. 2 illustrates a specific embodiment of the Error Correct means (B5 in FIG. 1B, or C7 in FIG. 1C) of the present invention. Referring to that figure, the two URZ signals (URZ and URZ$_d$) provided as inputs to the Error Correct means are each subjected to an individual charge test carried out by Individual Charge Detect means 200A and 200B, respectively. [Note that the output of the Subtractor (B4 or C6 in FIGS. 1B and 1C, respectively) is provided as an input to Error Correct 207 of this embodiment.] The individual charge test is conducted based on the waveform of URZ signals. Assuming that the "high" level for data coding is represented by a voltage level of 1 volt, a "1" coded in the URZ coding format is represented by a pulse with an amplitude of 1 volt immediately followed by a pulse having 0 voltage amplitude and the same pulse width as the preceding 1 volt pulse. Accordingly, for URZ coding there are two pulse components (with amplitudes of 1 volt and 0 volt, respectively) for a bit interval that is representative of a "1" in the data stream. In other words, for each bit interval representative of a "1" in the data stream, the URZ waveform returns to "0" immediately after a pulse rising to a high-level amplitude within the same bit interval. The individual charge test implemented by Charge Detect means 200A and 200B traces each rising edge in the waveform for each bit interval that contains a high-level pulse and checks to see if it is immediately followed by another pulse at the same "high" level (e.g., 1 volt). If the waveform has two continuous pulses of at the "high" level, then the second pulse is in error and is removed. The error detection method in the illustrative embodiment herein operates based on the fact that a "1" in URZ waveform returns to zero immediately after a high-level pulse, as opposed to a "1" in UNRZ waveform that maintains a "high" level for two equivalent URZ pulses.

After removal of error pulses by Charge Detect means 200A and 200B, the output URZ and URZ$_d$ signals are provided as an input to Sync 201 which operates to synchronize the two URZ signals. The synchronization operates to eliminate the delay in the URZ$_d$ signal, which must be removed in order for the two URZ signals to be combined at the next stage. Those synchronized URZ signals are then provided as an input to Adder 202, which sums the two synchronized URZ signals and provides that sum as an output to Filter 203. At Filter 203, the adder output is subjected to a threshold voltage (V$_{th}$) test.

The function of Adder 202 is to preserve "1"s that are reduced in power due to noise or dispersion effects during transmission in the data channel. For instance, assuming a bit in the original data is a "1" and has a voltage level of 1 volt prior to transmission, the bit may be received with a 0.4 volt magnitude due to the effects of noise and dispersion occurring during transmission. In conventional systems, the bit would be read as a "0" at the receiver because its magnitude is below the conventional threshold voltage, e.g., 0.5 volts. However, according to the method of the invention, when the two synchronized URZ signals are added, i.e., one being superimposed on the other, the result of the summing of a 0.4 volt level for each of the signals is 0.8 volts for the bit. The threshold voltage may be established by the system operator. However, for illustrative purposes, assume that the threshold level V$_{th}$ is set equal to the sum of the nominal voltage level for a "1" in each signal with that sum divided by 2.5. Thus, here, V$_{th}$=(1+1)/2.5=0.8 volts. Accordingly, for this illustrative case, with the method of the invention, the sum of the two URZ pulse magnitudes will equal the threshold voltage (V$_{th}$), and the bit is restored to 1 at the receiver.

The threshold voltage filtering feature (202 and 203 of FIG. 2) is particularly important for error detection for the case that both signals have identical errors in the same bit position (and thus such errors would not be detected by the subtraction error detector B4 of FIG. 1B, or C6 of FIG. 1C). Although the probability of mutual error in the same bit position is normally quite small, the invention, as embodied in the Adder 202 and Filter 203 of FIG. 2, has the capability of detecting mutual errors in both data sets.

An example is presented herein to illustrate the feature for detecting mutual errors according to the method the invention. At the data source, assume that a "1" is present in the data which is URZ encoded with a voltage level of 1 volt for each of the URZ data streams. Assume further that signal degradation due to noise or dispersion effects during transmission reduces the URZ encoded "1" in each data stream to voltage levels of 0.4 and 0.45 volts, respectively. Thus, assuming conventional signal level checking techniques, this bit position would be decoded as a "0". As a result, both data streams have an erroneous bit of "0" at the same bit position. According to the error detection method of B4 and B5 of FIG. 1B, the subtraction result will be zero and there is apparently no error. When the two data streams are subjected to error detection at 202 and 203 of FIG. 2, however, voltage threshold detection indicates the existence of a "1" for the bit position because 0.85 volts (i.e., 0.4+0.45 volts) is greater than $V_{th}$, the threshold voltage. Error-correct means 204 then resets "0"s in that bit position to "1"s for both data streams, and the original data are thus restored. The error-correct means at 204 removes bits that do not pass the threshold in Filter 203. The error-correct means (204) preserves bits in both data streams that pass the threshold test in Filter 203 and send them for further error detection to Cap Detector 205.

Cap Detector 205 applies a capacitor voltage charge violation test to the data. If a signal has two or more consecutive "1"s, it is sent to Error Correct means 206 for removal of error bits. Cap Detector 205 relies on the principle of URZ coding to detect unwanted errors of two or more consecutive "1"s in the data sequence. Error-correct means 206 then removes the error bits and preserves bits that pass error detection at 204.

Figure 3B:
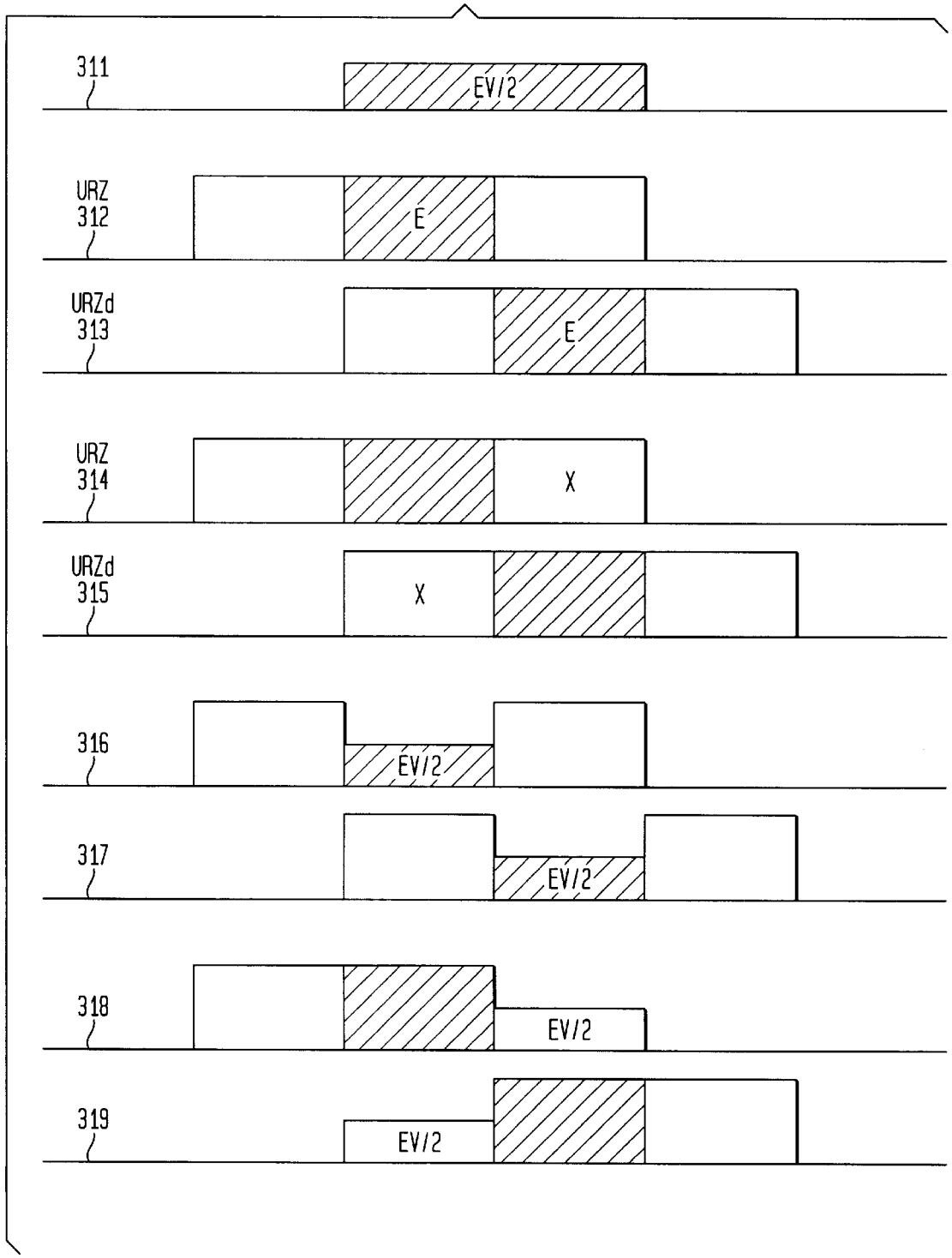

FIGS. 3A and 3B illustrate the method of the invention as applied in Cap Detector 205 of FIG. 2. Beginning with FIG. 3A, two waveforms representing the data stream "11" are shown coded as URZ (301) and $URZ_d$ (302). Waveforms 303 and 304 illustrate a received URZ and $URZ_d$ coded waveform in which an error pulse occurs between the two high-level "1" pulses. Adding the two waveforms containing the error pulse results in a composite waveform 305 (URZ+$URZ_d$) that carries an error voltage (EV), as shown.

The method of the invention as embodied in Cap Detector 205 subtracts half of the error voltage, or EV/2, from the diagonal pair bits of both URZ and $URZ_d$ waveforms and applies the individual charge test as described in 200A and 200 B of FIG. 2 to detect mutual errors between the pulses. Referring to FIG. 3B, the waveform of EV/2 is shown in 311. There are two sets of diagonal pair bits, E (waveforms 312 and 313) and X (waveforms 314 and 315). The subtraction results according to the method of the invention are illustrated in waveforms 316, 317, 318 and 319. Waveforms 316 and 317 show the subtraction result when it is assumed that the E diagonal pair bits are in error. Waveforms 318 and 319 show the subtraction result when it is assumed that the X diagonal pair bits are in error. Applying the individual charge test (as described hereinabove), it is readily seen that the waveforms of 316 and 317 correspond to correct URZ format while waveforms 318 and 319 do not conform to URZ format.

Figure 3C:
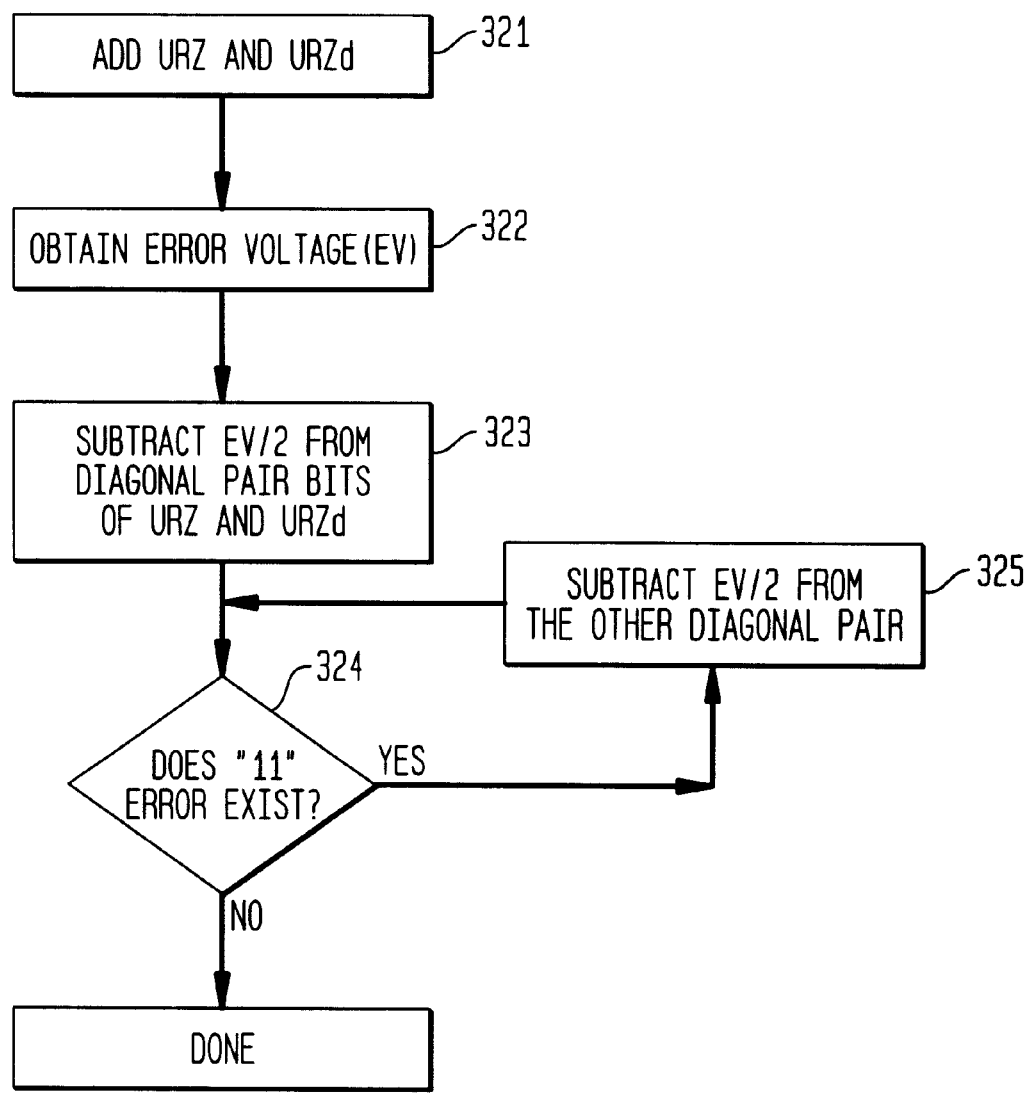
FIG. 3C is a flow chart of the method of the invention as embodied in the capacitance detector used in the error-correct function.

FIG. 3C is a flow chart of the method of the invention as embodied in the Cap Detect 205 of FIG. 2. Referring to the figure, the URZ signal is first added with its delayed replication ($URZ_d$) in Step 321 in order to obtain an error voltage (EV) in Step 322. According to the method of the invention, two sets of diagonal pairs are each hypothesized to be in error, illustrated as the E diagonal pair (312 and 313 of FIG. 3B) and the X diagonal pair (314 and 315 of FIG. 3B). In Step 323, EV/2 is subtracted from a diagonal pair, the result of which is tested in Step 324. Step 324 applies the individual charge test (as described hereinabove) to detect "11" errors. If there are no "11" errors, the error detection process is complete. If there are "11" errors, EV/2 is subtracted from the other diagonal pair, the result of which is tested again in Step 324. The process is repeated until there are no "11" errors.

Upon completion of the capacitor voltage charge test, Error-correct means 207 then removes the pulses responsible for +1 or −1 error bits (detected in B4 of FIG. 1B or C6 of FIG. 1C) and preserves bits that pass error detection at 204 and 206 for data transmission. The corrected URZ and $URZ_d$ signals are then sent to Adder B6 (FIG. 1B) or C8 (FIG. 1C) for summation that yields a UNRZ coding of the data (equivalent to the data at Data Source B1 or C1 of FIGS. 1B and 1C, respectively) at B7 (FIG. 1B) or C9 (FIG. 1C).

CONCLUSION

The invention presents a simple and easy method for detecting and correcting errors in data transmission without bandwidth and transmission power penalty. Compared with conventional error detection and correction methods, feedback error control between the transmitter and the receiver, and data retransmission are advantageously eliminated in the invention.

Changes and modifications in the specifically described embodiments can be carried out without departing from the scope of the invention. Although preferred embodiments are disclosed herein, they do not limit the scope of the present invention.

I claim:

1. An error detection and correction method for correcting errors in data transmitted across a propagation medium, the method comprising the steps of:
    coding a set of data to be transmitted to form a first URZ encoded data set;
    providing a second URZ encoded data set for the set of data to be transmitted, wherein the second URZ encoded data set is delayed relative to the first URZ encoded data set by a given time period;
    transmitting the first and second URZ encoded data sets across the propagation medium to a receiving location;
    at the receiving location, providing a synchronization of the second URZ encoded data set with the first URZ encoded data set;
    subtracting the synchronized second URZ encoded data set from the first URZ encoded data set to yield a subtraction result for each bit position;
    correcting errors as required for the first and second URZ encoded data sets based on a non-zero subtraction result at a given bit position; and
    summing the corrected first and second URZ encoded data sets to yield a UNRZ coding for the set of data.

2. The method of claim 1, wherein the error correcting step includes the substep of:
    if the subtraction result for a bit position is +1, removing 1 from the bit position in the first URZ encoded data set and resetting the same to 0.

3. The method of claim 1, wherein the error correcting step includes the substep of:
    if the subtraction result for a bit position is −1, removing 1 from the bit position in the second URZ encoded data set and resetting the same to 0.

4. The method of claim 1, wherein the given time period by which the second URZ encoded data set is delayed relative to the first URZ encoded data set is one half the bit interval of the data.

5. The method of claim 1, wherein the propagation medium consists of the group of single-path data transmission channels, two-path data transmission channels and multi-path transmission channels.

6. The method of claim 1 being used in a system that consists of the group of wireless, optical, cable, semiconductor waveguide, and free space media communications systems.

7. The method of claim 1, wherein the error correcting step includes the further step of performing an individual charge test on the first URZ encoded data set, the performing step further comprising the substeps of:

for each bit interval in the first URZ encoded data set, detecting bits representing a "1" in the data;

for each bit interval where a "1" in the data is detected, checking for a pulse with a voltage amplitude representing a "1" immediately followed by a second pulse with a voltage amplitude representing a "1" within the same bit interval, the second pulse being indicative of an error for the bit interval; and for each bit interval wherein an error pulse is found in the checking step, resetting the amplitude of the second pulse to a voltage amplitude representing a "0."

8. The method of claim 1, wherein the error correcting step includes the further step of performing an individual charge test on the second URZ encoded data set, the performing step further comprising the substeps of:

for each bit interval in the second URZ encoded data set, detecting bits representing a "1" in the data;

for each bit interval wherein a "1" in the data is detected, checking for a pulse with a voltage amplitude representing a "1" immediately followed by a second pulse with a voltage amplitude representing a "1" within the same bit interval, the second pulse being indicative of an error for the bit interval; and for each bit interval wherein an error pulse is found in the checking step, resetting the amplitude of the second pulse with a voltage amplitude representing a "0."

9. The method of claim 1, wherein the error correcting step includes the further step of performing a threshold voltage test, the performing step further comprising the substeps of:

providing a synchronization of the second URZ encoded data set with the first URZ encoded data set;

summing the first URZ encoded data set and the second URZ encoded data set, yielding a summation result for each bit interval in the data;

for each bit interval that has a summation result greater than or equal to a given threshold voltage, causing the bit interval to be set to a "1."

10. The method of claim 1, wherein the error correcting step includes the further step of performing a capacitance detector test for detecting and correcting mutual errors in the first and second URZ encoded data sets, the performing step further comprising the substeps of:

providing a synchronization of the second URZ encoded data set with the first URZ encoded data set;

summing the synchronized first URZ encoded data set and the second URZ encoded data set, yielding a summation result;

extracting an error voltage (EV) from the summation result;

subtracting half the error voltage (EV/2) from a first set of diagonal pair bits in the first and second URZ encoded data sets, yielding a first subtraction result waveform;

subtracting half the error voltage (EV/2) from a second set of diagonal pair bits in the first and second URZ encoded data sets, yielding a second subtraction result waveform;

detecting which of the first and second subtraction result waveforms conforms to URZ coding format, yielding a correct waveform that conforms to URZ coding format; and correcting the first and second URZ encoding data sets based on the detecting step.

11. An error detection and correction apparatus for correcting errors in data transmitted across a propagation medium, comprising:

means for coding a set of data to be transmitted to form a first URZ encoded data set;

means for providing a second URZ encoded data set for the set of data to be transmitted, wherein the second URZ encoded data set is delayed relative to the first URZ encoded data set by a given time period;

means for transmitting the first and second URZ encoded data sets across the propagation medium to a receiving location;

at the receiving location, means for providing a synchronization of the second URZ encoded data set with the first URZ encoded data set;

means for subtracting the synchronized second URZ encoded data set from the first URZ encoded data set to yield a subtraction result for each bit position;

means for correcting errors as required for the first and second URZ encoded data sets based on a non-zero subtraction result at a given bit position; and means for summing the corrected first and second URZ encoded data sets to yield a UNRZ coding for the set of data.

12. The apparatus in claim 11, wherein the means for correcting errors includes:

if the subtraction result for a bit position is +1, means for removing 1 from the bit position in the first URZ encoded data set and resetting the same to 0.

13. The apparatus in claim 11, wherein the means for correcting errors includes:

if the subtraction result for a bit position is −1, means for removing 1 from the bit position in the second URZ encoded data set and resetting the same to 0.

14. The apparatus in claim 11, wherein the given time period by which the second URZ encoded data set is delayed relative to the first URZ encoded data set is one half the bit interval of the data.

15. The apparatus in claim 11, wherein the propagation medium consists of the group of single-path data transmission channels, two-path data transmission channels and multi-path transmission channels.

16. The apparatus in claim 11 being used in a system that consists of the group of wireless, optical, cable, semiconductor waveguide, and free space media communications systems.

17. The apparatus in claim 11, wherein the means for correcting errors includes an individual charge test means for testing the first URZ encoded data set, the individual charge test means further comprising:

for each bit interval in the first URZ encoded data set, means for detecting bits representing a "1" in the data;

for each bit interval where a "1" in the data is detected by the detecting means, means for checking for a pulse with a voltage amplitude representing a "1" immediately followed by a second pulse with a voltage amplitude representing a "1" within the same bit interval, the second pulse being indicative of an error for the bit interval; and for each bit interval wherein an error pulse is found by the checking means, means for resetting the amplitude of the second pulse to a voltage amplitude representing a "0."

18. The apparatus in claim 11, wherein the means for correcting errors includes an individual charge test means for testing the second URZ encoded data set, the individual charge test means further comprising:

for each bit interval in the second URZ encoded data set, means for detecting bits representing a "1" in the data;

for each bit interval wherein a "1" in the data is detected, means for checking for a pulse with a voltage amplitude representing a "1" immediately followed by a second pulse with a voltage amplitude representing a "1" within the same bit interval, the second pulse being indicative of an error for the bit interval; and for each bit interval wherein an error pulse is found by the checking means, means for resetting the amplitude of the second pulse with a voltage amplitude representing a "0."

19. The apparatus in claim 11, wherein the means for correcting errors includes a threshold voltage test means, further comprising:

means for providing a synchronization of the second URZ encoded data set with the first URZ encoded data set;

means for summing the first URZ encoded data set and the second URZ encoded data set, the summing means yielding a summation result for each bit interval in the data;

for each bit interval that has a summation result greater than or equal to a given threshold voltage, means for causing the bit interval to be set to a "1."

20. The apparatus in claim 11, wherein the means for correcting errors includes a cap detect means for detecting and correcting mutual errors in the first and second URZ encoded data sets, the cap detect means further comprising:

means for providing a synchronization of the second URZ encoded data set with the first URZ encoded data set;

means for summing the synchronized first URZ encoded data set and the second URZ encoded data set, the summing means yielding a summation result;

means for extracting an error voltage (EV) from the summation result;

a first means for subtracting half the error voltage (EV/2) from a first set of diagonal pair bits in the first and second URZ encoded data sets, the first subtracting means yielding a first subtraction result waveform;

a second means for subtracting half the error voltage (EV/2) from a second set of diagonal pair bits in the first and second URZ encoded data sets, the second subtraction means yielding a second subtraction result waveform;

means for detecting which of the first and second subtraction result waveforms conforms to URZ coding format, the detecting means yielding a correct waveform that conforms to URZ coding format; and means for correcting the first and second URZ encoding data sets based on the correct waveform yielded by the detecting means.

\* \* \* \* \*